UNITED STATES PATENT OFFICE 2,050,288

PROCESS FOR CONCENTRATING LOWER ALIPHATIC ACIDS

Henry Dreyfus, London, England

No Drawing. Application August 25, 1933, Serial No. 686,738. In Great Britain September 29, 1932

13 Claims. (Cl. 260—122)

This invention relates to the concentration of aqueous solutions of lower aliphatic acids and especially to the production of highly concentrated acetic acid from dilute acetic acid, for example crude pyroligneous acid or the dilute acetic acid obtained as a waste product in acetylation processes such as the production of cellulose acetate etc.

Economic processes for the concentration of dilute acetic acid are of very great importance, and in fact the existence of such processes is practically essential if the production of certain acetic acid derivatives, and in particular cellulose acetate, is to be effected successfully from a commercial point of view. In producing cellulose acetate, for instance, a quantity of dilute acetic acid at least of the order of 10 times the quantity of cellulose acetate is obtained as a by-product, and it will be appreciated that this acid must be concentrated at very small cost for further use if the cellulose acetate is to be sold at a low price. Even the saving of a fraction of a cent per pound in the concentration of the acetic acid may make all the difference between commercial success and failure in the production and marketing of the cellulose acetate.

In my prior U. S. application S. No. 470,233 filed 23rd July, 1930, which has issued as Patent No. 1,952,845, I have described a process of concentrating acetic acid in which water is precipitated from a mixture of the acid and a solvent by means of a liquid of low solvent power for water. More particularly I have described the concentration of acetic acid by extracting the dilute acid with a solvent such as ether, and thereafter precipitating any extracted water from the extract by means of a hydrocarbon, for example benzene. The present application is a continuation in part of U. S. application S. No. 470,233.

I have now found that when concentrating acetic acid by extracting its aqueous solutions and thereafter precipitating the water of the extract in the aforesaid manner, it is not essential to precipitate the water in a distinct and separate operation. I have discovered that the process may be simplified to a considerable degree by introducing the water-precipitating liquid during the extraction process. Thus, when the extraction of the dilute acid with the solvent is being effected in a systematic manner, i. e. by bringing the solvent into contact with acid of progressively increasing concentration, the water-precipitating liquid may simply be introduced at a suitable stage of the process and in this way the necessity for a separate water-precipitating operation avoided.

Systematic extraction may be effected by means of a series of batch operations, the extract from one operation being used to extract acid from aqueous acid of higher concentration than that extracted in the first mentioned operation. Again, and in general more conveniently, at least when working on a large scale, systematic extraction may be effected in a continuous counter-current operation, the solvent being caused to flow in contact with the aqueous acid and in counter-current thereto. The liquid of low solvent power for water may then simply be added to the solvent at a suitable point in the flow of the latter in contact with the aqueous acid. It will be appreciated that the liquid of low solvent power for water should be added to the solvent after contact of the latter with dilute acid but before the final contact.

The invention is of especial advantage when the extraction process is conducted in a column apparatus, using the counter-current principle. In this case the dilute acid may flow through the extraction column in counter-current to the solvent employed for the extraction, the water-precipitating liquid being simply introduced at a suitable point of the column. In this way acetic acid may be concentrated, while utilizing the principles set forth in U. S. Patent No. 1,952,845, but without the necessity for using any special or additional apparatus for effecting the precipitation of the water and its subsequent separation from the extract. At the most a slightly longer extraction apparatus may be required, or if desired a slightly reduced output may be accepted when utilizing the same column.

The water-precipitating liquid may be introduced into the extraction process at any suitable point. The most advantageous point will depend upon the nature of the solvent employed and upon the nature of the water-precipitating liquid introduced. Thus the water-precipitating liquid may be introduced at about the middle point of the extraction apparatus, or at a point more towards the outlet at which the solvent charged with extracted acid is discharged.

If desired, instead of adding the water-precipitating liquid at a single point of the extraction apparatus, it may be added at two, three or more points in any desired positions.

As in the case of the process described in U. S. Patent No. 1,952,845, any desired solvents for the lower aliphatic acids may be employed, for example any of those mentioned in U. S. Patent No. 1,952,845, e. g. ether, ethyl acetate, acetone oils and the like, the solvents being preferably chosen with particular regard to their efficiency in extracting lower aliphatic acids from their aqueous solutions. The fact that the solvent may simultaneously take up more or less water together with the acid is of less moment, as the introduction of the water-precipitant ensures the desired low water content of the final extract. If desired however the solvents may be used in admixture with hydrocarbons, in the manner described in U. S. Patent No. 1,696,432, or with other similarly acting substances having a low solvent power for water, e. g. a halogenated hydrocarbon such as methylene chloride or carbon tetrachloride. The solvents, whether used with or without hydrocarbons or other admixture, may be used in conjunction with salts according to the known art to reduce their solubility in water.

Likewise, as water-precipitating liquids there may be employed any suitable liquids capable of diminishing the solubility of water in the solvents, and these liquids will, in general, be such as are substantially non-solvents for water, for example, hydrocarbons, e. g. petroleum distillates, benzene or the like, and halogenated aliphatic hydrocarbons, e. g. carbon tetrachloride, dichlorethylene, trichlorethylene and acetylene tetrachloride. Other compounds which may advantageously be employed are the substantially water-insoluble oxygen-containing compounds for example ketones, ethers or esters, referred to in my U. S. application S. No. 661,566 filed March 18th, 1933, as of great value as additions to solvents to be used for the extraction of lower fatty acids from their aqueous solutions. The choice of the water-precipitating liquid will depend in any particular case upon the particular acid to be concentrated and the solvent employed for the extraction. Preferably the liquid used is one which may readily be separated from the solvent and from the acid by distillation or otherwise, for example its boiling point should differ considerably from that of each. Thus, for example, when ether is employed as the solvent in the extraction process water may be separated from the extract by introduction of benzene or a petroleum distillate of approximately the same boiling point as benzene, say of boiling point 60-90° C. or of a halogenated hydrocarbon such as chloroform or carbon tetrachloride. In the case of ethyl acetate introduction of petroleum ether of boiling point about 40-60° C. or of a petroleum distillate boiling at 90-100° C. has been found suitable. If desired the water-precipitating liquid may consist of a further quantity of the same liquid which has been added to the solvent used in the extraction process when such addition has been made.

Any desired apparatus may be utilized for the systematic extraction of the acid. Particularly good results may be obtained as regards efficiency of extraction and economy of upkeep of the apparatus by utilizing a vertical column which may if desired be filled with suitable packing material. If as will usually be the case, the extracting medium is specifically lighter than the aqueous acid, the latter will be introduced at the top of the column and the medium at the bottom, while the reverse will obtain if the medium is specifically heavier. Either or both the acid and the extracting medium may be introduced into the column through sprays, nozzles or the like.

It will be appreciated that in selecting the solvent and/or the water-precipitating liquid, regard should be had to their specific gravities and to the specific gravity of the resulting mixture. In order that extraction may be most effectively carried out, it is very desirable that the specific gravity of the solvent or of the solvent in admixture with the water-precipitating liquid should differ appreciably from that of the acid to be extracted. It is of course of little moment whether the extracting medium has a lower or higher specific gravity than the acid to be extracted.

The mixture of solvent, water-precipitating liquid and concentrated acid flowing from the extraction apparatus may subsequently be separated into its components in any desired manner, for example by distillation. A liquid comprising concentrated acetic acid, ether and either benzene or a petroleum distillate boiling at about 70-90° C. may for instance, be introduced into a column distillation apparatus, ether vapours being drawn off at the top. The liquid drawn off from the base of the column and comprising concentrated acid and benzene or petroleum distillate may then be treated in a second distillation column, concentrated acetic acid being drawn off from the lower end.

Both the solvent used for the extraction and the water-precipitating liquid introduced during the extraction may advantageously be such as form with water azeotropic mixtures of boiling points below those of the said solvent and additions thereto. Where such is the case it is not essential to add so much water-precipitating liquid as to yield a final extract substantially free from water, since appreciable quantities of water may be distilled off subsequently together with the solvent etc. If desired still further quantities of water may be removed in the form of azeotropic mixtures by returning the solvent and/or water-precipitating liquid, after condensation and separation from water, in the known manner to the distillation vessel or to appropriate points in the distillation column where such is employed.

The invention has been described principally with reference to the concentration of acetic acid, but it may, of course, be applied to the concentration of other lower aliphatic acids, for example propionic acid.

What I claim and desire to secure by Letters Patent is:—

1. A process for the concentration of a lower aliphatic acid, which comprises extracting an aqueous solution of a lower aliphatic acid with a solvent for the acid and thereafter diminishing the solvent power of the extract for water, and then utilizing the extract to extract acid from an aqueous solution of the lower aliphatic acid of higher concentration than the initial solution which was extracted.

2. A process for the concentration of a lower aliphatic acid, which comprises successively extracting a series of aqueous solutions of the lower aliphatic acid of successively increasing concentration with the same body of a solvent for the acid, a liquid of low solvent power for water being added to the solvent employed in the extraction after the first extraction but prior to the final extraction.

3. A process for the concentration of a lower aliphatic acid, which comprises extracting an aqueous solution of a lower aliphatic acid with a solvent for the acid passing in continuous counter-current to said aqueous acid and continuously adding a liquid of low solvent power for water to the solvent at at least one point of the course of the solvent between its initial contact and its final contact with the dilute acid and spaced apart from the point of initial contact.

4. A process for the concentration of acetic acid, which comprises extracting an aqueous solution of acetic acid with a solvent for the acid and thereafter diminishing the solvent power of the extract for water, and then utilizing the extract to extract acid from an aqueous solution of the acetic acid of higher concentration than the initial solution which was extracted.

5. A process for the concentration of acetic acid, which comprises successively extracting a series of aqueous solutions of the acetic acid of successively increasing concentration with the same body of a solvent for the acid, a liquid of low solvent power for water being added to the solvent employed in the extraction after the first extraction but prior to the final extraction.

6. A process for the concentration of acetic acid, which comprises extracting an aqueous solution of acetic acid with a solvent for the acid passing in continuous counter-current to said aqueous acid and continuously adding a liquid of low solvent power for water to the solvent at at least one point of the course of the solvent between its initial contact and its final contact with the dilute acid and spaced apart from the point of initial contact.

7. A process for the concentration of a lower aliphatic acid, which comprises extracting an aqueous solution of a lower aliphatic acid with a solvent selected from the group consisting of ether and ethyl acetate, and thereafter diminishing the solvent power of the extract for water by adding thereto a liquid of low solvent power for water and then utilizing the extract to extract acid from an aqueous solution of the lower aliphatic acid of higher concentration than the initial solution which was extracted.

8. A process for the concentration of acetic acid, which comprises successively extracting a series of aqueous solutions of the acetic acid of successively increasing concentration with the same body of a solvent selected from the group consisting of ether and ethyl acetate, a liquid of low solvent power for water being added to the solvent employed in the extraction, after the first extraction but prior to the final extraction.

9. A process for the concentration of acetic acid, which comprises extracting an aqueous solution of acetic acid with a solvent selected from the group consisting of ether and ethyl acetate, said solvent passing in continuous counter-current to said aqueous acid, and continuously adding a liquid of low solvent power for water to the solvent at at least one point of the course of the solvent between its initial contact and its final contact with the dilute acid and spaced apart from the point of initial contact.

10. A process for the concentration of acetic acid, which comprises extracting an aqueous solution of acetic acid with a solvent for the acid passing in continuous counter-current to said aqueous acid and continuously adding a liquid having a low solvent power for water and having a boiling point differing substantially from that of the solvent, to the solvent at at least one point of the course of the solvent between its initial contact and its final contact with the dilute acid and spaced apart from the point of initial contact.

11. A process for the concentration of a lower aliphatic acid, which comprises successively extracting a series of aqueous solutions of the lower aliphatic acid of successively increasing concentration with the same body of a solvent for the acid, a hydrocarbon having a boiling point differing substantially from that of the solvent being added to the solvent employed in the extraction after the first extraction but prior to the final extraction.

12. A process for the concentration of a lower aliphatic acid, which comprises successively extracting a series of aqueous solutions of the lower aliphatic acid of successively increasing concentration with the same body of a solvent for the acid, benzene being added to the solvent employed in the extraction after the first extraction but prior to the final extraction.

13. A process for the concentration of acetic acid, which comprises extracting an aqueous solution of acetic acid with a solvent selected from the group consisting of ether and ethyl acetate, said solvent passing in continuous counter-current to said aqueous acid, and continuously adding benzene to the solvent at at least one point of the course of the solvent between its initial contact and its final contact with the dilute acid and spaced apart from the point of initial contact.

HENRY DREYFUS.